(12) United States Patent
Ito et al.

(10) Patent No.: US 10,549,751 B2
(45) Date of Patent: Feb. 4, 2020

(54) TRANSMITTING DEVICE, AND COMMUNICATION SYSTEM

(71) Applicant: PANASONIC INTELLECTUAL PROPERTY MANAGEMENT CO., LTD., Osaka (JP)

(72) Inventors: Hayashi Ito, Kanagawa (JP); Kouji Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/083,798

(22) PCT Filed: Feb. 17, 2017

(86) PCT No.: PCT/JP2017/005871
§ 371 (c)(1),
(2) Date: Sep. 10, 2018

(87) PCT Pub. No.: WO2017/154517
PCT Pub. Date: Sep. 14, 2017

(65) Prior Publication Data
US 2019/0077399 A1 Mar. 14, 2019

(30) Foreign Application Priority Data
Mar. 11, 2016 (JP) ................. 2016-048923

(51) Int. Cl.
*B60W 30/09* (2012.01)
*G08G 1/09* (2006.01)
(Continued)

(52) U.S. Cl.
CPC ......... *B60W 30/0956* (2013.01); *B60R 21/00* (2013.01); *G08G 1/09* (2013.01);
(Continued)

(58) Field of Classification Search
CPC ... B60W 30/0956; H04W 4/46; H04W 4/023; H04W 4/40; H04W 4/06; G08G 1/167;
(Continued)

(56) References Cited

U.S. PATENT DOCUMENTS 9,734,717 B1 * 8/2017 Surpi .................... G08G 1/166
2010/0302371 A1 * 12/2010 Abrams ............... G08G 1/0175
348/149

FOREIGN PATENT DOCUMENTS

JP 2002-183889 A 6/2002
JP 2006-085285 A 3/2006
(Continued)

OTHER PUBLICATIONS

U.S. Appl. No. 15/957,209 to Tom Tanigawa et al., filed Apr. 19, 2018.
(Continued)

*Primary Examiner* — Rodney A Butler
(74) *Attorney, Agent, or Firm* — Greenblum & Bernstein, P.L.C.

(57) ABSTRACT

A transmitting device is mountable in a vehicle. A first detector detects entry of another vehicle into vicinity of a vehicle mounted with the transmitting device. A second detector detects stabilization in a relationship between the other vehicle and the vehicle after the first detector detects the entry. A recording unit records a vehicle behavior of the vehicle from timing when the first detector detects the entry of the other vehicle to timing when the second detector detects the stabilization in the relationship between the other vehicle and the vehicle. A transmitter transmits the vehicle behavior recorded in the recording unit after the second detector detects the stabilization.

6 Claims, 8 Drawing Sheets

(51) Int. Cl.
  *B60R 21/00* (2006.01)
  *G08G 1/16* (2006.01)
  *H04W 4/02* (2018.01)
  *B60W 30/095* (2012.01)
  *H04W 4/46* (2018.01)
  *H04W 4/40* (2018.01)
  *H04W 4/06* (2009.01)

(52) U.S. Cl.
  CPC ............... *G08G 1/16* (2013.01); *G08G 1/162* (2013.01); *G08G 1/166* (2013.01); *G08G 1/167* (2013.01); *H04W 4/023* (2013.01); *H04W 4/40* (2018.02); *H04W 4/46* (2018.02); *H04W 4/06* (2013.01)

(58) Field of Classification Search
  CPC .......... G08G 1/166; G08G 1/162; G08G 1/16; G08G 1/09; B60R 21/00
  See application file for complete search history.

(56) References Cited

FOREIGN PATENT DOCUMENTS

JP  2008-087545 A  4/2008
JP  2008-234414 A  10/2010

OTHER PUBLICATIONS

International Search Report issued in International Bureau of WIPO Patent Application No. PCT/JP2017/005871, dated Apr. 25, 2017.

\* cited by examiner

FIG. 1A
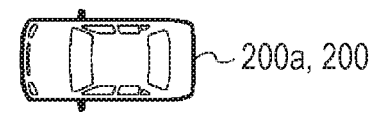
FIG. 1B
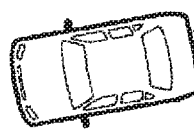
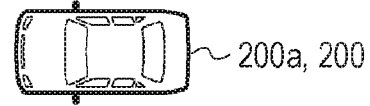
FIG. 1C
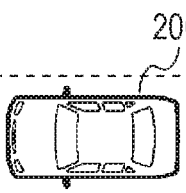
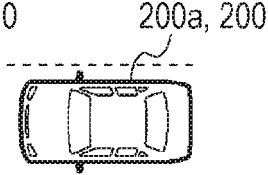
FIG. 1D
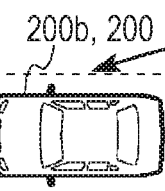
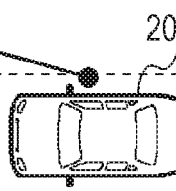

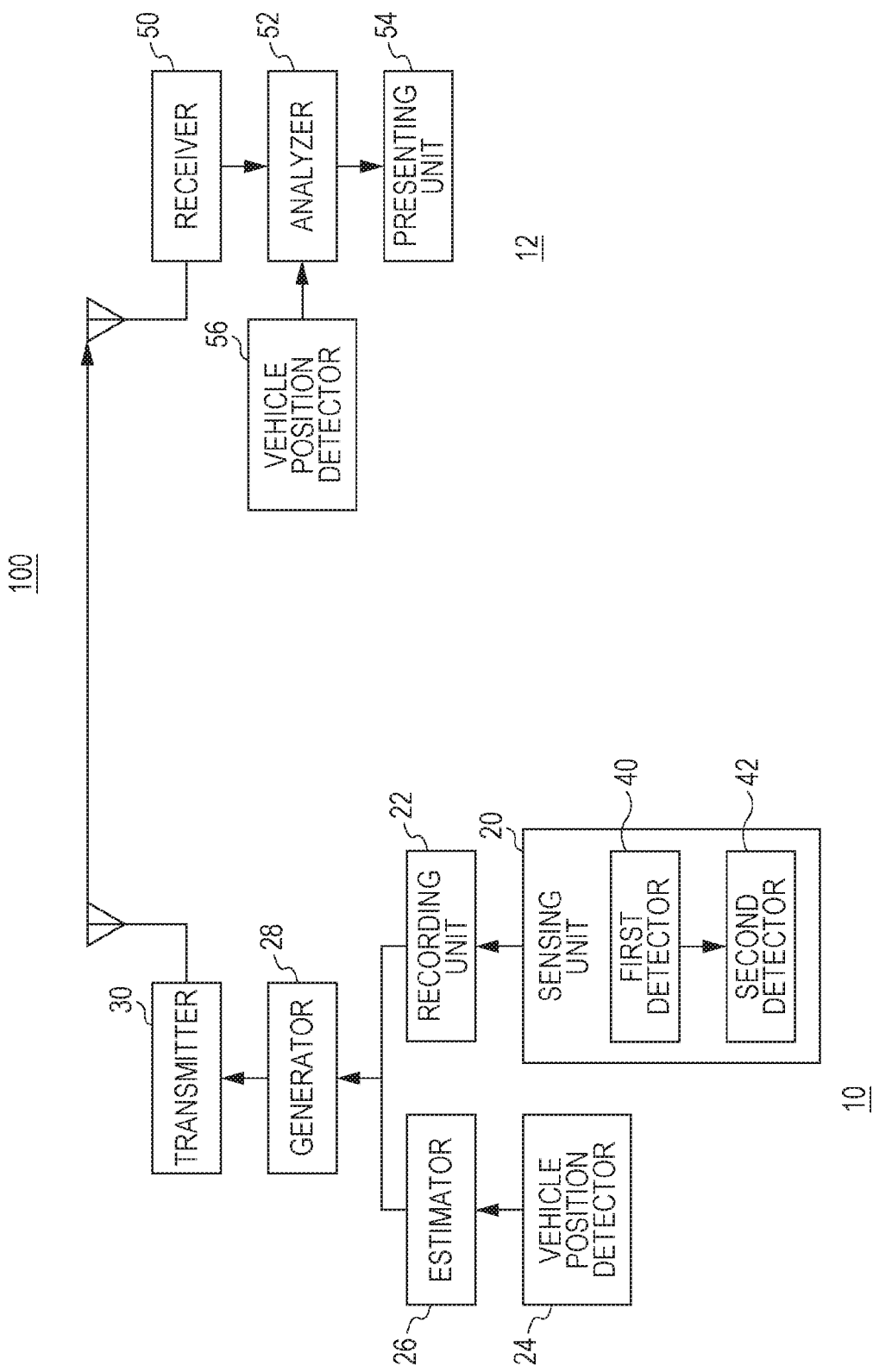

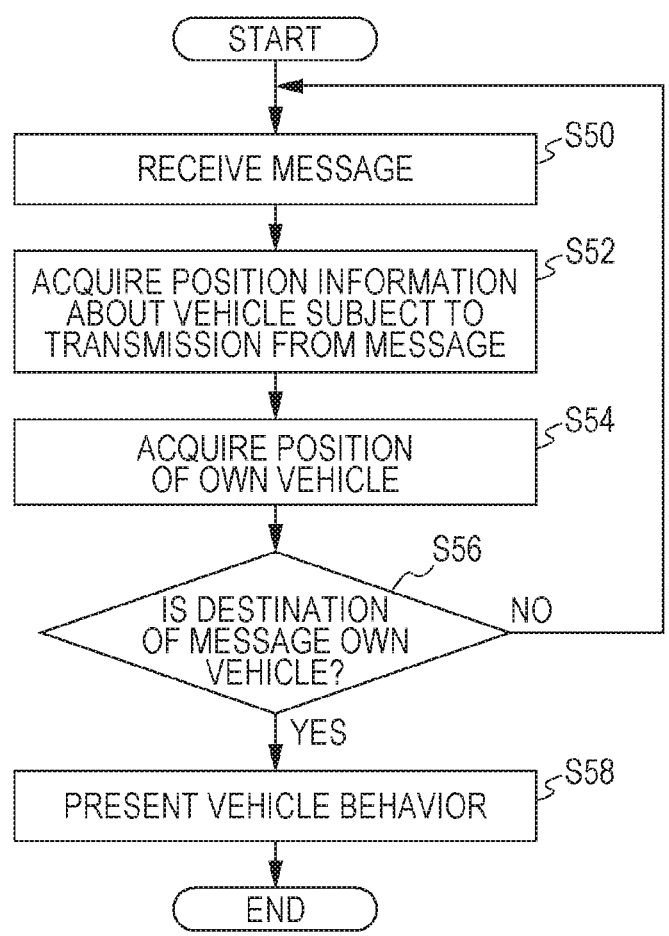

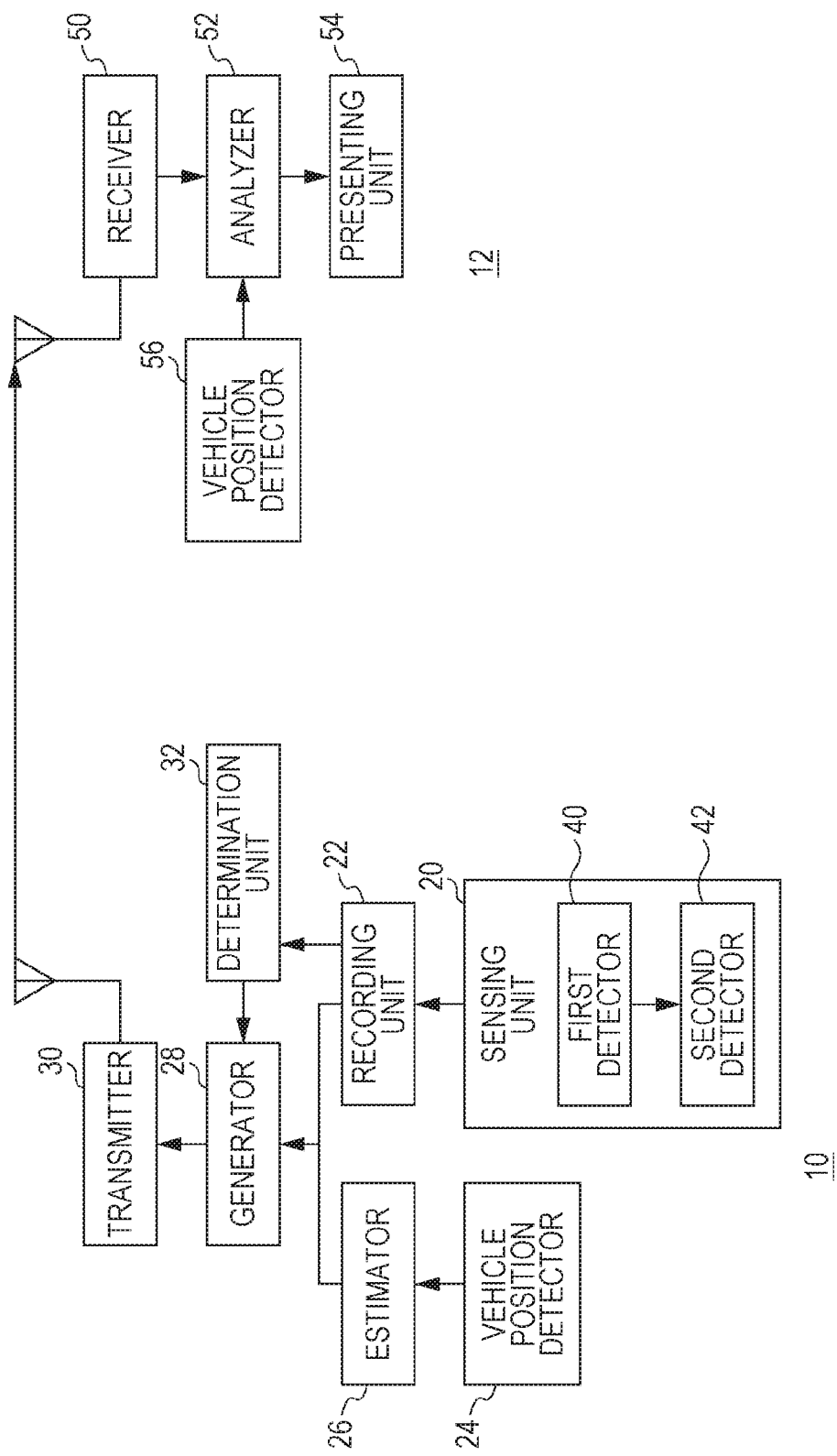

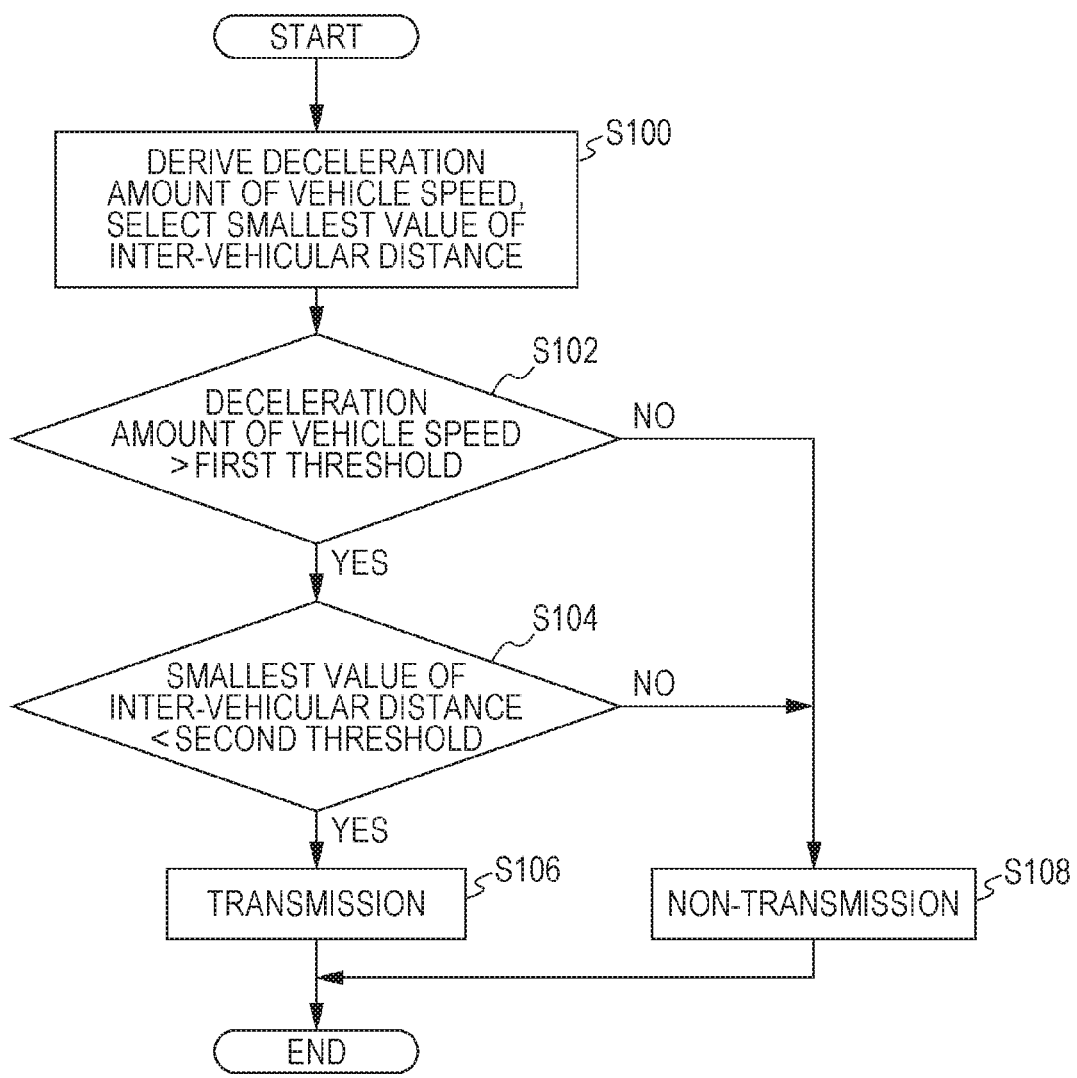

TRANSMITTING DEVICE, AND COMMUNICATION SYSTEM

This application is a U.S. national stage application of the PCT International Application No. PCT/JP2017/005871 filed on Feb. 17, 2017, which claims the benefit of foreign priority of Japanese patent application 2016-048923 filed on Mar. 11, 2016, the contents all of which are incorporated herein by reference.

TECHNICAL FIELD

The present invention relates to a communication technique, and more particularly, to a transmitting device and a communication system that transmit or receive a signal containing predetermined information.

BACKGROUND ART

In conventional inter-vehicle communication, only specific information about a vehicle is transmitted and received with a constant cycle. Further, based on that information, a display lamp or a buzzer provides information to a driver. However, when such information is provided, an approaching vehicle might advance to the same place. In order to cope with this problem, another vehicle that is predicted to affect traveling of an own vehicle is determined, and information about driver's intentions is bidirectionally transmitted or received between the own vehicle and the other vehicle (for example, see Patent Literature 1).

CITATION LIST

Patent Literature

PTL 1: Unexamined Japanese Patent Publication No. 2002-183889

SUMMARY OF THE INVENTION

The present invention provides a technique that, after completion of one driving action, notifies another vehicle of a vehicle behavior.

An aspect of the present invention provides a transmitting device that is mountable in a vehicle. The transmitting device includes a first detector, a second detector, a recording unit, and a transmitter. The first detector detects entry of another vehicle into vicinity of a vehicle mounted with the transmitting device. After the first detector detects the entry of the other vehicle, the second detector detects stabilization in a relationship between the other vehicle and the vehicle. The recording unit records a behavior of at least one of the vehicle and the other vehicle from timing when the first detector detects the entry to timing when the second detector detects the stabilization in the relationship between the other vehicle and the vehicle. After the second detector detects the stabilization, the transmitter transmits the behavior of the vehicle recorded in the recording unit.

Another aspect of the present invention provides a communication system. The communication system includes a transmitting device mountable in a first vehicle, and a reception device mountable in a second vehicle different from the first vehicle. The transmitting device includes a first detector, a second detector, a recording unit, and a transmitter. The first detector detects entry of the second vehicle into vicinity of the first vehicle. After the first detector detects the entry of the second vehicle, the second detector detects stabilization in a relationship between the second vehicle and the first vehicle. The recording unit records a behavior of the first vehicle from timing when the first detector detects the entry of the second vehicle to timing when the second detector detects the stabilization. After the second detector detects the stabilization in the relationship between the second vehicle and the first vehicle, the transmitter transmits the behavior of the first vehicle recorded in the recording unit. The reception device includes a receiver and a processor. The receiver receives the behavior of the first vehicle transmitted from the transmitter. The processor processes the vehicle behavior received by the receiver.

Still another aspect of the present invention provides a transmitting device mountable in a vehicle. The transmitting device includes a first detector, a second detector, a recording unit, and a transmitter. The first detector detects lane change starting indicating that the other vehicle starts making a lane change into a lane where the vehicle mounted with the transmitting device travels. After the detection of the lane change starting, the second detector detects lane change completion indicating that a distance between the vehicle and the other vehicle is a safe distance or the distance falls within a predetermined variation range for a certain period. The recording unit records behavior information about the other vehicle from the detection of the lane change starting until the detection of the lane change completion. After the detection of the lane change completion, the transmitter transmits the behavior information about the other vehicle recorded in the recording unit.

Any combinations of the above-described components and modifications of the features of the present invention in methods, devices, systems, recording media, and computer programs are still effective as other aspects of the present invention.

According to the present invention, after one driving action is completed, other vehicle can be notified of a vehicle behavior.

BRIEF DESCRIPTION OF DRAWINGS

FIG. 1A is a diagram illustrating an operation of a vehicle mounted with a communication system according to a first exemplary embodiment of the present invention.

FIG. 1B is a diagram illustrating an operation of the vehicle mounted with the communication system according to the first exemplary embodiment of the present invention.

FIG. 1C is a diagram illustrating an operation of the vehicle mounted with the communication system according to the first exemplary embodiment of the present invention.

FIG. 1D a diagram illustrating an operation of the vehicle mounted with the communication system according to the first exemplary embodiment of the present invention.

FIG. 2 is a diagram illustrating a configuration of the communication system according to the first exemplary embodiment of the present invention.

FIG. 6 is a flowchart illustrating a reception procedure to be performed by a reception device in FIG. 2.

FIG. 7 is a diagram illustrating a configuration of a communication system according to a second exemplary embodiment of the present invention.

FIG. 8 is a flowchart illustrating a transmission procedure to be performed by the transmitting device in FIG. 7.

DESCRIPTION OF EMBODIMENTS

First Exemplary Embodiment

Figure 3:
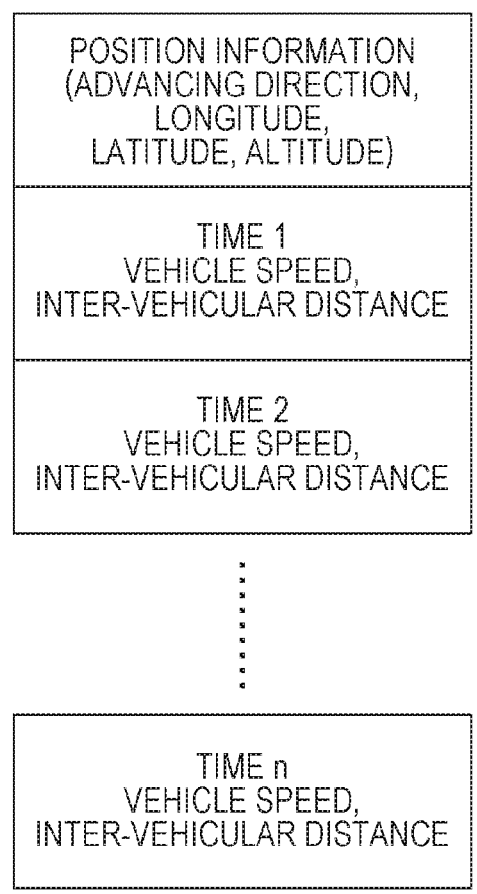
FIG. 3 is a diagram illustrating a data structure of a message to be generated by a generator in FIG. 2.

Before an exemplary embodiment of the present invention is described, problems in a conventional technique will be briefly described. In conventional inter-vehicle communication, timing of information transmission is set before an actual lane change or before merging. On the other hand, rapid deceleration or vehicle approach that is caused in a procedure for completion of the lane change or the merging is occasionally desired to be transmitted to other vehicle.

Prior to specific description of the exemplary embodiment of the present invention, an outline of the present invention will be described herein. The exemplary embodiment of the present invention relates to a communication system that conducts inter-vehicle communication between wireless devices mounted in vehicles. The inter-vehicle communication may also be referred to as vehicle to vehicle (V2V) communication. The inter-vehicle communication utilizes radio communication in an intelligent transport system to which a 700 MHz band (760 MHz) or 5.9 GHz is allocated, and allows information to be broadcasted (notified) among vehicles and infrastructures. One example of specifications (physical layer's specifications) for inter-vehicle communication in Japan is ARIB STD-T109. Information transmitted or received through the inter-vehicle communication may be parameters, such as a vehicle ID (32 bits), time information, a latitude, a longitude, an altitude, a vehicle speed, a vehicle azimuth, forward or backward acceleration, a shift position, a steering angle, a vehicle size, a vehicle width, and a vehicle length, a yaw rate, and a brake state. In addition, a 60-byte free area is prepared for transmitting information containing free contents.

Herein, in front of a vehicle that travels along a lane (hereinafter, referred to as a "first vehicle"), another vehicle (hereinafter, referred to as a "second vehicle") approaches through a lane change. When the second vehicle approaches in right front of the first vehicle or the second vehicle that is slower than the first vehicle in a vehicle speed approaches, the first vehicle might need to rapidly decelerate or change a lane. Since such a driving by a driver of the second vehicle might cause a collision accident of vehicles, the driver of the second vehicle is desired to be notified about how to change a lane.

In order to cope with this, when a sensor detects occurrence of a lane change or merging of the second vehicle, in the first vehicle, a behavior of the first vehicle is recorded until the lane change or the merging process is completed. Further, the first vehicle estimates position information about the second vehicle based on position information and a traveling direction of the first vehicle. Further, the first vehicle performs broadcast transmission of a message including the recorded vehicle behavior through the inter-vehicle communication, while the estimated position information being attached to the message. Vehicles that are traveling in vicinity of the first vehicle receive the message. The second vehicle in the vehicles that are traveling in vicinity of the first vehicle interprets that a destination of the message is the second vehicle, based on the position information included in the message, and notifies the driver about the vehicle behavior included in the message.

FIG. 1A to FIG. 1D illustrate operations of vehicles 200 mounted with a communication system. First vehicle 200a and second vehicle 200b are collectively called vehicles 200. Herein, the operation proceeds in chronological order as illustrated in FIG. 1A, FIG. 1B, FIG. 1C, and FIG. 1D. FIG. 1A illustrates an "initial state". First vehicle 200a travels from right toward left in the drawing. On the other hand, second vehicle 200b travels from right toward left in the drawing, on a lane adjacent to the lane where first vehicle 200a travels. First vehicle 200a and second vehicle 200b travel toward the same direction. Second vehicle 200b precedes first vehicle 200a. Second vehicle 200b corresponds to a preceding vehicle, and first vehicle 200a corresponds to a rear vehicle.

FIG. 1B is a state following the state in FIG. 1A, and second vehicle 200b starts making a lane change toward a lane where first vehicle 200a travels. In first vehicle 200a, the sensor detects lane change starting of second vehicle 200b, and a vehicle speed of first vehicle 200a and an inter-vehicular distance between first vehicle 200a and second vehicle 200b are started being recorded. For this reason, FIG. 1B can be said to illustrate a "lane change starting" state.

FIG. 1C is a state following the state in FIG. 1B, and second vehicle 200b travels in front of first vehicle 200a on a lane where first vehicle 200a travels. That is, a lane where second vehicle 200b travels is changed. On the other hand, in first vehicle 200a, generally a deceleration process is executed in order to maintain the inter-vehicular distance with respect to second vehicle 200b. Further, in first vehicle 200a, the vehicle speed of first vehicle 200a, and the inter-vehicular distance between first vehicle 200a and second vehicle 200b are continuously recorded. For this reason, FIG. 1C can be said to illustrate a "lane changing" state.

FIG. 1D is a state following the state in FIG. 1C, and the inter-vehicular distance between first vehicle 200a and second vehicle 200b becomes constant. Alternatively, the inter-vehicular distance between first vehicle 200a and second vehicle 200b obtains a safe value. That is, the lane change of second vehicle 200b is completed, and the traveling of first vehicle 200a is stabilized. In first vehicle 200a, the sensor detects the stabilization and the recording is ended. For this reason, FIG. 1D can be said to illustrate a "lane change completed" state. In the "lane change completed" state, a message including the recorded vehicle speed and inter-vehicular distance is transmitted from first vehicle 200a, and is received by second vehicle 200b.

FIG. 2 illustrates a configuration of communication system 100. Communication system 100 includes transmitting device 10 and reception device 12. Transmitting device 10 includes sensing unit 20, recording unit 22, vehicle position detector 24, estimator 26, generator 28, and transmitter 30. Sensing unit 20 includes first detector 40 and second detector 42. Reception device 12 includes receiver 50, analyzer 52, presenting unit 54, and vehicle position detector 56. Herein, transmitting device 10 is mounted in first vehicle 200a, and reception device 12 is mounted in second vehicle 200b. Note that first vehicle 200a is mounted also with reception device 12. Transmitting device 10 and reception device 12 configure a wireless device. Further, also in second vehicle 200b, a wireless device is configured similarly. In order to clarify the description, the wireless device is described as transmitting device 10 and reception device 12.

In transmitting device 10, sensing unit 20 is disposed on a head portion of first vehicle 200*a* in order to sense a vicinity of first vehicle 200*a*, such as a front of first vehicle 200*a*. For example, sensing unit 20 may include an in-vehicle camera, a light detection and ranging (LIDAR), a sonar, a time-of-flight (TOF) camera, or a radar. Alternatively, sensing unit 20 may include a combination of an in-vehicle camera, a LIDAR, a sonar, a TOF camera, and a radar. Sensing unit 20 detects a situation of the front of first vehicle 200*a* through sensing. The situation of the front corresponds to whether other vehicle 200 or an obstacle exists in the front.

First detector 40 detects entry (appearance) of second vehicle 200*b* into a vicinity in front of first vehicle 200*a* based on a detection result of sensing unit 20. This corresponds to a case where a transition is made from a situation that second vehicle 200*b* does not exist to a situation that second vehicle 200*b* exists within a predetermined distance from sensing unit 20 to the front, for example, within 20 m. A publicly-known technique may be used for detecting the situation that second vehicle 200*b* does not exist or the situation that second vehicle 200*b* exists. Therefore, description thereof is omitted. In first detector 40, a state that the entry of second vehicle 200*b* into a vicinity in front of first vehicle 200*a* is detected corresponds to the above-described "lane change starting" state. If first detector 40 detects the entry of second vehicle 200*b*, first detector 40 notifies second detector 42 and recording unit 22 of the detection.

After receiving notification from first detector 40, namely, after the entry of second vehicle 200*b* is detected by first detector 40, second detector 42 detects stabilization in a relationship between second vehicle 200*b* and first vehicle 200*a*, based on the detection result in sensing unit 20. This is detected when the distance between sensing unit 20 and second vehicle 200*b* (hereinafter, this is also referred to as an "inter-vehicular distance") falls within a predetermined variation range for a constant period. For example, when the inter-vehicular distance varies within a range of 5 m for 10 seconds, second detector 42 detects the stabilization. This corresponds to that the inter-vehicular distance becomes constant. Note that if the inter-vehicular distance obtains a safe value, second detector 42 may detect the stabilization. In second detector 42, the state that the stabilization is detected corresponds to the above-described "lane change completed" state. First detector 40 notifies recording unit 22 of the detection when the stabilization is detected.

When receiving the notification from first detector 40, recording unit 22 periodically records the vehicle speed of first vehicle 200*a* and the inter-vehicular distance between first vehicle 200*a* and second vehicle 200*b*. Herein, the vehicle speed of first vehicle 200*a* is input from an electronic control unit (ECU: not illustrated) of first vehicle 200*a*. Further, the inter-vehicular distance between first vehicle 200*a* and second vehicle 200*b* is input from sensing unit 20. Such a periodic recording continues until the notification from second detector 42 is received.

That is, recording unit 22 records a behavior of first vehicle 200*a* from timing when first detector 40 detects the entry of second vehicle 200*b* to timing when second detector 42 detects the stabilization in the relationship between second vehicle 200*b* and first vehicle 200*a*. Herein, the timing when first detector 40 detects the entry of second vehicle 200*b* through the timing when second detector 42 detects the stabilization in the relationship between second vehicle 200*b* and first vehicle 200*a* correspond to the above-described "lane changing" state. Further, the behavior of first vehicle 200*a* may include information other than the inter-vehicular distance and the vehicle speed. When the recording is completed, recording unit 22 outputs the vehicle behavior to generator 28.

Vehicle position detector 24 is compatible with global navigation satellite system(s) (GNSS), and measures a position where first vehicle 200*a* exists. The position measurement is periodically conducted. Vehicle position detector 24 outputs the measurement result to estimator 26. Estimator 26 receives the measurement result from vehicle position detector 24 and the sensing result from sensing unit 20. Estimator 26 adds a relative position from first vehicle 200*a* toward second vehicle 200*b* represented by the sensing result to the position of first vehicle 200*a* represented by the measurement result, to estimate position information about second vehicle 200*b*. Estimator 26 outputs the estimated position information to generator 28.

Generator 28 receives the vehicle behavior from recording unit 22 and the position information from estimator 26. Generator 28 generates a message so that the vehicle behavior and the position information are included. FIG. 3 illustrates a data structure of the message to be generated by generator 28. As illustrated, the message includes the position information, and as the vehicle behavior, the vehicle speeds and the inter-vehicular distances at a plurality of times. For this reason, the vehicle behavior can be said to be a traveling history. The description returns to FIG. 2. Generator 28 outputs the message to transmitter 30.

When receiving the message from generator 28, transmitter 30 performs broadcasting transmission of the message according to the inter-vehicle communication. That is, after second detector 42 detects the stabilization in the relationship between second vehicle 200*b* and first vehicle 200*a*, broadcast transmission of the vehicle behavior recorded in recording unit 22 and the position information estimated by estimator 26 is performed.

Receiver 50 in reception device 12 is compatible with the inter-vehicle communication, and receives the message on which the broadcast transmission is performed from transmitter 30. That is, receiver 50 receives the vehicle behavior and the position information transmitted from transmitter 30. Receiver 50 outputs the message to analyzer 52. Vehicle position detector 56 executes the process similar to the process in vehicle position detector 24 to measure a position where second vehicle 200*b* exists. Note that when reception device 12 is integral with transmitting device 10, vehicle position detector 56 and vehicle position detector 24 may be commonly used. Vehicle position detector 56 outputs the measurement result to analyzer 52.

When receiving the message from receiver 50, analyzer 52 extracts the position information included in the message. Further, analyzer 52 receives also the measurement result from vehicle position detector 56. Further, analyzer 52 derives a distance between a position indicated by the measurement result and the position information. Further, analyzer 52 compares the derived distance to a threshold. If the distance is larger than the threshold, analyzer 52 determines that a destination of the message is not reception device 12 to discard the message. On the other hand, if the distance is less than or equal to the threshold, analyzer 52 determines that the destination of the message is reception device 12 to extract the vehicle behavior included in the message.

Analyzer 52 derives a deceleration amount of the vehicle speed for a predetermined period, based on the vehicle speed included in the vehicle behavior. As the deceleration amount is larger, a situation that first vehicle 200*a* has to rapidly be decelerated due to the lane change of second vehicle 200*b* is more likely to occur. Therefore, driving of second vehicle 200b performed by the driver is not preferable. For this reason, analyzer 52 compares the deceleration amount to a first threshold. If the deceleration amount is larger than the first threshold, analyzer 52 determines that the driving is in a first state. This state corresponds to the above-described unpreferable driving. On the other hand, if the deceleration amount is less than or equal to the first threshold, analyzer 52 determines that the driving is in a third state.

Further, analyzer 52 selects a smallest value of the inter-vehicular distance from the inter-vehicular distance included in the vehicle behavior. If the smallest value of the inter-vehicular distance is smaller than a second threshold, analyzer 52 determines that the driving is in a second state. This state also corresponds to the above-described unpreferable driving. On the other hand, if the smallest value of the inter-vehicular distance is more than or equal to the second threshold, analyzer 52 determines that the driving is in the third state. In such a manner, analyzer 52 processes the vehicle behavior. Analyzer 52 outputs the determination result to presenting unit 54.

Presenting unit 54 receives the determination result from analyzer 52. Presenting unit 54 notifies the driver of second vehicle 200b about contents of the determination result. Presenting unit 54 is, for example, configured by a monitor and a speaker. When second vehicle 200b is traveling, presenting unit 54 outputs a sound corresponding to the determination result from the speaker. In the first state, presenting unit 54 outputs a sound "the lane change is causing rapid deceleration of the rear vehicle". In the second state, presenting unit 54 outputs a sound "the inter-vehicular distance with respect to the rear vehicle is shortened due to the lane change". In the third state, presenting unit 54 outputs a sound "good lane change".

Figure 4A:
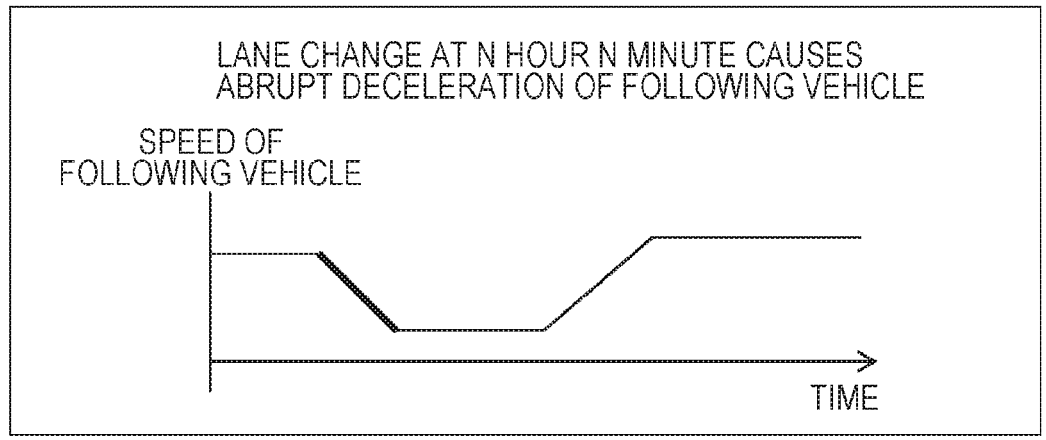
FIG. 4A is a diagram illustrating a screen displayed on a presenting unit in FIG. 2.
Figure 4B:
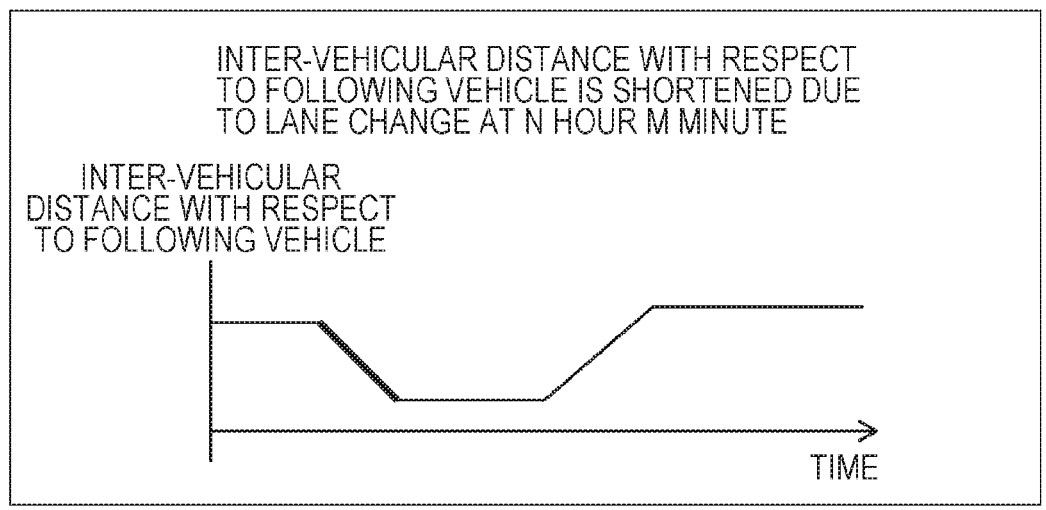
FIG. 4B is a diagram illustrating a screen displayed on the presenting unit in FIG. 2.

After second vehicle 200b travels or while second vehicle 200b stops, presenting unit 54 displays screens illustrated in FIG. 4A and FIG. 4B on the monitor. FIG. 4A and FIG. 4B illustrate the screens to be displayed on presenting unit 54. FIG. 4A illustrates the screen to be displayed in the case of the first state, and FIG. 4B illustrates the screen to be displayed in the case of the second state.

This configuration can be achieved with a central processing unit (CPU), a memory, and other large scale integration (LSI) circuit of any computer in terms of hardware or with a program loaded on the memory in terms of software. The drawings herein illustrate functional blocks achieved through cooperation of these components. Hence, it will be understood by those skilled in the art that these functional blocks can be achieved in various forms by the hardware alone or by combinations of the hardware and the software.

Figure 5:
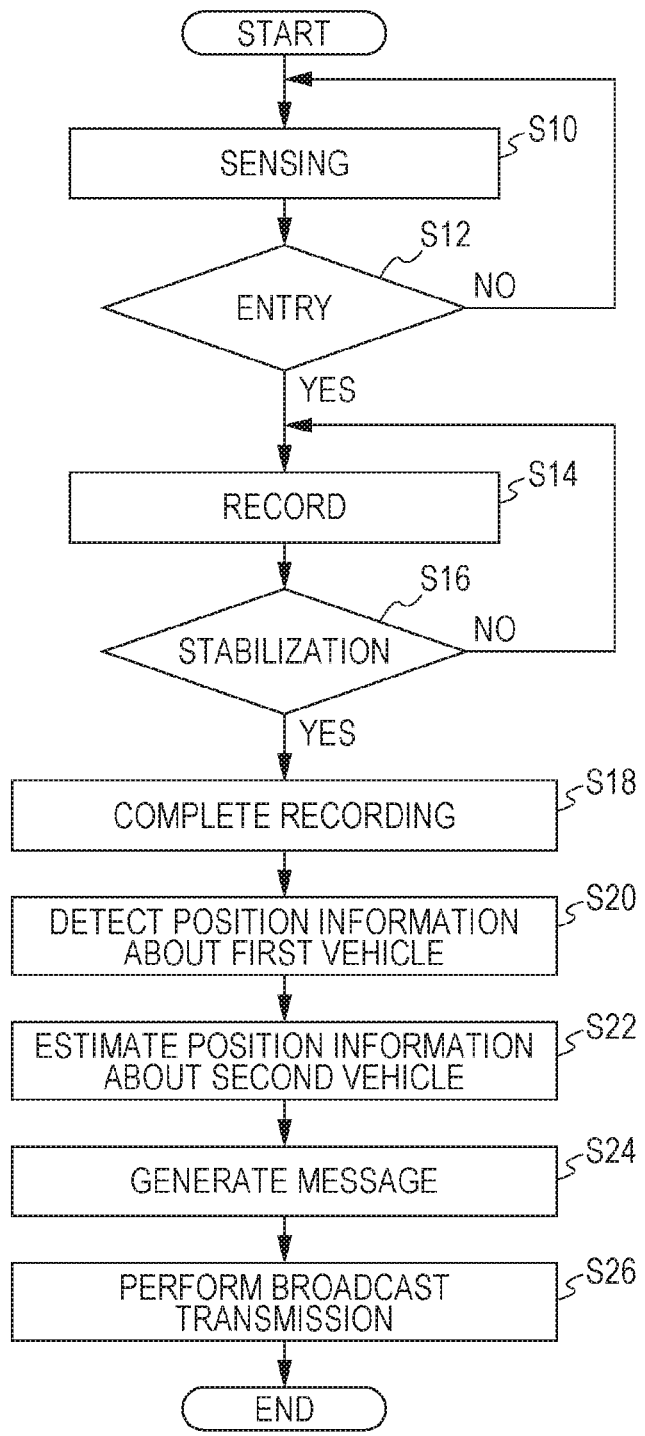
FIG. 5 is a flowchart illustrating a transmission procedure to be performed by a transmitting device in FIG. 2.

An operation of communication system 100 configured above will be described. FIG. 5 is a flowchart illustrating a transmission procedure to be performed by transmitting device 10. Sensing unit 20 performs sensing (S10). If first detector 40 does not detect the entry of second vehicle 200b (N in S12), the process returns to step S10. If first detector 40 detects the entry of second vehicle 200b (Y in S12), recording unit 22 periodically records the vehicle behavior (S14). If second detector 42 does not detect the stabilization (N in S16), the process returns to step S14. If second detector 42 detects the stabilization (Y in S16), recording unit 22 completes the recording (S18). Vehicle position detector 24 detects position information about the first vehicle (S20). Estimator 26 estimates position information about the second vehicle (S22). Generator 28 generates a message (S24). Transmitter 30 performs broadcast transmission of the message (S26).

FIG. 6 is a flowchart illustrating a reception procedure in reception device 12. Receiver 50 receives a message (S50). Analyzer 52 acquires position information about a vehicle subject to transmission from the message (S52). Vehicle position detector 56 acquires position information about the own vehicle (S54). If analyzer 52 does not determine that a destination of the message is the own vehicle (N in S56), the process returns to step S50. On the other hand, if analyzer 52 determines that the destination of the message is the own vehicle (Y in S56), presenting unit 54 presents a vehicle behavior (S58).

According to the present exemplary embodiment, the vehicle behavior that is recorded from the entry of the second vehicle to the stabilization in the relationship between the second vehicle and the first vehicle is transmitted after stabilization. Thus, after one driving action is completed, the second vehicle can be notified about the vehicle behavior. Further, since the second vehicle is notified about the vehicle behavior after one driving action is completed, the driver of the second vehicle can be urged to improve driving. Further, since the position information about the second vehicle is also transmitted, the destination of the vehicle behavior can be provided even if identification information about the reception device mounted in the second vehicle is unknown. Further, since the position information about the second vehicle is also transmitted, the destination of the vehicle behavior can be provided even in broadcast transmission. Further, according to a lane change and merging of the own vehicle, the driver of the second vehicle can be notified of a change in the behavior of the second vehicle.

Second Exemplary Embodiment

Hereinafter, a second exemplary embodiment will be described. The second exemplary embodiment also relates to a communication system that conducts inter-vehicle communication between wireless devices mounted in vehicles similarly to the first exemplary embodiment. Also in the second exemplary embodiment, in the first vehicle, a behavior of the first vehicle is recorded from the lane change starting to the lane change completion of the second vehicle, and broadcast transmission is performed on a message including the vehicle behavior. Further, in the second vehicle, the driver is notified of the vehicle behavior included in the message. On the other hand, in the first vehicle according to the second exemplary embodiment, a determination is made whether a message is generated according to contents of the vehicle behavior. That is, when the risk indicated by the vehicle behavior is low, the message is not generated and the broadcast transmission is not performed. Such a process represses an increase in a traffic amount of the inter-vehicle communication. Communication system 100 according to the second exemplary embodiment also relates to an operation of similar type to the operation of the vehicle mounted with the communication system according to the first exemplary embodiment illustrated in FIG. 1. Herein, the following description will be mainly centered on a difference from the first exemplary embodiment.

FIG. 7 illustrates a configuration of communication system 100. Communication system 100 includes transmitting device 10 and reception device 12. Transmitting device 10 includes sensing unit 20, recording unit 22, vehicle position detector 24, estimator 26, generator 28, transmitter 30, and determination unit 32. Sensing unit 20 includes first detector 40 and second detector 42. Reception device 12 is configured similarly to FIG. 2.

Determination unit 32 determines a risk of traveling of second vehicle 200b based on the vehicle behavior recorded in recording unit 22. Specifically, similarly to analyzer 52, determination unit 32 derives, based on the vehicle speed included in the vehicle behavior, the deceleration amount of the vehicle speed for a predetermined period, and selects the smallest value of the inter-vehicular distance from the inter-vehicular distance included in the vehicle behavior. Determination unit 32 compares the deceleration amount with a first threshold. If the deceleration amount is less than or equal to the first threshold, determination unit 32 determines that the risk is low.

If the deceleration amount is larger than the first threshold, determination unit 32 compares the shortest distance of the vehicle speed to a second threshold. If the smallest value of the inter-vehicular distance is more than or equal to the second threshold, determination unit 32 determines that the risk is low. On the other hand, if the smallest value of the inter-vehicular distance is smaller than the second threshold, determination unit 32 determines that the risk is high. Note that the first threshold and second threshold in determination unit 32 may be set to values different from the first threshold and the second threshold in analyzer 52. Determination unit 32 outputs a determination result to generator 28.

Generator 28 receives the determination result from determination unit 32. If the determination result indicates that the risk is high, generator 28 generates a message. For this reason, transmitter 30 performs broadcast transmission of the message. On the other hand, if the determination result indicates that the risk is low, transmitter 30 does not generate a message. For this reason, transmitter 30 does not perform the broadcast transmission of the message.

An operation of communication system 100 configured above will be described. FIG. 8 is a flowchart illustrating a transmission procedure to be performed by transmitting device 10. Determination unit 32 derives the deceleration amount of the vehicle speed and selects the shortest value of the inter-vehicular distance (S100). If the deceleration amount of the vehicle speed is larger than the first threshold (Y in S102) and the shortest value of the inter-vehicular distance is smaller than the second threshold (Y in S104), transmitter 30 performs the broadcast transmission of a message (S106). If the deceleration amount of the vehicle speed is not larger than the first threshold (N in S102) or the shortest value of the inter-vehicular distance is not smaller than the second threshold (N in S104), transmitter 30 does not transmit a message (S108).

According to the present exemplary embodiment, when the risk is relatively low, the vehicle behavior is not transmitted, and thus an increase in the traffic amount can be suppressed. Further, when the risk is relatively high, broadcast transmission of the vehicle behavior is performed. For this reason, after one driving action is completed, the second vehicle can be notified of the vehicle behavior.

The present invention is described above based on the exemplary embodiments. It will be understood by those skilled in the art that the exemplary embodiments are merely examples, other modifications in which components and/or processes of the exemplary embodiments are variously combined are possible, and the other modifications still fall within the scope of the present invention.

In the first and second exemplary embodiments, sensing is performed on the front of first vehicle 200a by sensing unit 20. However, not limited to this, for example, the sensing may be performed on a rear or a side other than the front of first vehicle 200a by sensing unit 20. According to the present modifications, other vehicles that approach from various directions can be detected.

In the first and second exemplary embodiments, sensing unit 20 detects second vehicle 200b. However, not limited to this, for example, second vehicle 200b may be detected by utilizing the inter-vehicle communication, or second vehicle 200b may be detected by utilizing a combination of the inter-vehicle communication and sensing unit 20. The present modifications can improve the degree of freedom in the configuration.

An outline of a first aspect of the present invention is as follows. An aspect of the present invention provides a transmitting device mountable in a vehicle. The transmitting device includes a first detector, a second detector, a recording unit, and a transmitter. The first detector detects entry of another vehicle into vicinity of a vehicle mounted with the transmitting device. After the first detector detects the entry of the other vehicle, the second detector detects stabilization in a relationship between the other vehicle and the own vehicle. The recording unit records a vehicle behavior of at least one of the vehicle and the other vehicle from timing when the first detector detects the entry to timing when the second detector detects the stabilization in the relationship between the other vehicle and the vehicle. The transmitter transmits the vehicle behavior recorded in the recording unit after the second detector detects the stabilization.

According to this aspect, since the vehicle behavior of at least one of the vehicle and the other vehicle that is recorded from the entry of the other vehicle to the stabilization in the relationship between the other vehicle and the vehicle is transmitted after the stabilization. For this reason, after one driving action is completed, the other vehicle can be notified about the vehicle behavior of the vehicle.

The transmitting device may further include an estimator that estimates position information about the other vehicle. The transmitter may transmit the position information about the other vehicle estimated by the estimator together as well as the vehicle behavior of the vehicle recorded in the recording unit. In this case, since the position information about the other vehicle is also transmitted, a destination of the vehicle behavior of the vehicle can be presented.

The transmitting device may further include a determination unit that determines a risk that traveling of the other vehicle causes accident based on the vehicle behavior of the vehicle recorded in the recording unit. The transmitter may transmit the vehicle behavior of the vehicle recorded in the recording unit when the risk determined by the determination unit is relatively high, and does not transmit the vehicle behavior recorded in the recording unit when the risk determined by the determination unit is relatively low. In this case, when the risk is relatively low, the vehicle behavior of the vehicle is not transmitted, and thus an increase in traffic amount can be suppressed.

Another aspect of the present invention provides a communication system. The communication system includes a transmitting device that is mountable in a first vehicle and a reception device mountable in a second vehicle different from the first vehicle. The transmitting device includes a first detector, a second detector, a recording unit, and a transmitter. The first detector detects entry of the second vehicle into vicinity of the first vehicle. After the first detector detects the entry of the second vehicle, the second detector detects stabilization in a relationship between the second vehicle and the first vehicle. The recording unit records vehicle behavior of the first vehicle from timing when the first detector detects the entry of the second vehicle to timing when the second detector detects stability in a relationship between the second vehicle and the first vehicle. The transmitter transmits the vehicle behavior of the first vehicle recorded in the recording unit after the second detector detects the stability in the relationship between the second vehicle and the first vehicle. The reception device includes a receiver and a processor. The receiver receives the vehicle behavior of the first vehicle transmitted from the transmitter. The processor processes the vehicle behavior received by the receiver.

Still another aspect of the present invention provides a transmitting device mountable in a vehicle. The transmitting device includes a first detector, a second detector, a recording unit, and a transmitter. The first detector detects lane change starting indicating that the other vehicle starts making a lane change into a lane where the vehicle mounted with the transmitting device travels. After the detection of the lane change starting, the second detector detects lane change completion indicating that a distance between the vehicle and the other vehicle is a safe distance or falls within a predetermined variation range for a certain period. The recording unit records the behavior information about the vehicle from the detection of the lane change starting to the detection of the lane change completion. The transmitter transmits the behavior information about the other vehicle recorded in the recording unit after the detection of the lane change completion.

INDUSTRIAL APPLICABILITY

The transmitting device and the communication system of the present invention are mountable in a vehicle, and are expected to be utilized.

REFERENCE MARKS IN THE DRAWINGS

- 10: transmitting device
- 12: reception device
- 20: sensing unit
- 22: recording unit
- 24: vehicle position detector
- 26: estimator
- 28: generator
- 30: transmitter
- 32: determination unit
- 40: first detector
- 42: second detector
- 50: receiver
- 52: analyzer
- 54: presenting unit
- 56: vehicle position detector
- 100: communication system
- 200, 200a, 200b: vehicle

The invention claimed is:

1. A transmitting device mountable in a vehicle, comprising:
    a first detector that detects entry of another vehicle into vicinity of the vehicle mounted with the transmitting device;
    a second detector that, after the first detector detects the entry of the other vehicle, detects stabilization in a relationship between the other vehicle and the vehicle;
    a memory that records a vehicle behavior of at least one of the vehicle and the other vehicle from timing when the first detector detects the entry of the other vehicle to timing when the second detector detects the stabilization;
    a transmitter that transmits the vehicle behavior recorded in the memory after the second detector detects the stabilization; and
    an estimator that estimates position information about the other vehicle,
    wherein the transmitter transmits the vehicle behavior recorded in the memory and also the position information estimated by the estimator.

2. The transmitting device according to claim 1, further comprising a determination processor that determines a risk that traveling of the other vehicle causes accident based on the vehicle behavior recorded in the memory,
    wherein when the risk determined by the determination processor is relatively high, the transmitter transmits the vehicle behavior recorded in the memory, and when the risk determined by the determination processor is relatively low, the transmitter does not transmit the vehicle behavior recorded in the memory.

3. A communication system comprising:
    a transmitting device mountable in a first vehicle; and
    a reception device mountable in a second vehicle different from the first vehicle,
    wherein the transmitting device includes
        a first detector that detects entry of the second vehicle into vicinity of the first vehicle,
        a second detector that detects stabilization in a relationship between the second vehicle and the first vehicle after the first detector detects the entry of the second vehicle,
        a memory that records a vehicle behavior of the first vehicle from timing when the first detector detects the entry of the second vehicle to timing when the second detector detects the stabilization, and
        a transmitter that transmits the vehicle behavior recorded in the memory after the second detector detects the stabilization, and
    the reception device includes
        a receiver that receives the vehicle behavior transmitted from the transmitter, and
        a processor that processes the vehicle behavior received by the receiver.

4. A transmitting device mountable in a vehicle, comprising:
    a first detector that detects a lane change starting indicating that another vehicle starts making a lane change into a lane where the vehicle mounted with the transmitting device travels;
    a second detector that detects lane change completion indicating that a distance between the vehicle and the other vehicle is a safe distance or falls within a predetermined variation range for a constant period after detection of the lane change starting;
    a memory that records behavior information about the other vehicle from the detection of the lane change starting to detection of the lane change completion; and
    a transmitter that transmits the behavior information about the other vehicle recorded in the memory after the detection of the lane change completion.

5. The transmitting device according to claim 4, further comprising an estimator that estimates position information about the other vehicle, wherein the transmitter transmits the position information estimated by the estimator, together with the behavior information about the other vehicle recorded in the memory.

6. The transmitting device according to claim 4, further comprising a determination processor that determines a risk of accident based on the behavior information about the other vehicle recorded in the memory, wherein when the risk determined by the determination processor is equal to or more than a threshold, the transmitter transmits the behavior information about the other vehicle recorded in the memory, and when the risk determined by the determination processor is less than the threshold, the transmitter does not transmit the behavior information about the other vehicle recorded in the memory.

\* \* \* \* \*